(12) United States Patent
Niki et al.

(10) Patent No.: US 6,237,641 B1
(45) Date of Patent: May 29, 2001

(54) HOSE FOR A REFRIGERANT FOR AN ELECTRICALLY DRIVEN COMPRESSOR

(75) Inventors: Nobuaki Niki, Inuyama; Norihiko Furuta, Komaki, both of (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 09/434,285

(22) Filed: Nov. 5, 1999

(30) Foreign Application Priority Data

Nov. 6, 1998 (JP) .................................................. 10-315227

(51) Int. Cl.$^7$ ....................................................... F16L 11/08
(52) U.S. Cl. .......................... 138/126; 138/137; 138/141; 138/143; 138/DIG. 10
(58) Field of Search ..................................... 138/137, 141, 138/140, 143, 125, 126, DIG. 1, DIG. 7, DIG. 10, 127

(56) References Cited

U.S. PATENT DOCUMENTS

| 4,905,736 | 3/1990 | Kitami et al. .......................... 138/137 |
| 5,149,732 | 9/1992 | Igarashi et al. ........................ 524/315 |
| 5,271,977 | 12/1993 | Yoshikawa et al. ................. 428/35.9 |
| 5,362,530 | 11/1994 | Kitami et al. ......................... 428/36.2 |
| 5,476,121 | * 12/1995 | Yoshikawa et al. .............. 138/143 X |
| 5,488,975 | * 2/1996 | Chiles et al. ...................... 138/137 X |
| 5,622,210 | * 4/1997 | Crisman et al. .................. 138/140 X |
| 5,839,478 | * 11/1998 | Colcombet et al. ............. 138/140 X |
| 6,074,717 | * 6/2000 | Little et al. ....................... 138/143 X |

FOREIGN PATENT DOCUMENTS

| 63-013935 | 1/1988 | (JP) . |
| 4-131233 | 5/1992 | (JP) . |
| 10-259893 | 3/1999 | (JP) ................................ F16L/39/02 |
| 11-264488 | 9/1999 | (JP) . |

* cited by examiner

*Primary Examiner*—Patrick Brinson
(74) *Attorney, Agent, or Firm*—Jacobson, Price, Holman & Stern, PLLC

(57) ABSTRACT

A hose for transporting a refrigerant for an electrically driven compressor has an inner layer of rubber having high resistance to an ester oil, and a laminated layer including a metallic foil, or a metallic layer formed by vapor deposition. It exhibits high degrees of electric insulation, refrigerant resistance, waterproofness and vibration resistance, and is suitable for use with an electrically driven compressor in an automobile air conditioner.

17 Claims, 4 Drawing Sheets

HOSE FOR A REFRIGERANT FOR AN ELECTRICALLY DRIVEN COMPRESSOR

BACKGROUND OF THE INVENTION

1. Field of the Invention

This invention relates to a hose used for conveying a refrigerant containing an ester oil as a refrigerator oil (lubricant) to an electrically driven compressor. This invention is suitable for use with, among others, an electrically driven compressor in an automobile air conditioner.

2. Description of the Related Art

FIG. 1 shows by way of example a hose which has hitherto been used for transporting a refrigerant to an engine driven compressor in an automobile air conditioner. It comprises an inner tube 1 formed from e.g. IIR (isobutylene-isoprene rubber), a reinforcing layer 2 formed by e.g. braided fiber and an outer tube 3 formed from e.g. EPDM (ethylene-propylene-diene rubber). This structure has been employed to give the hose resistance to vibration, and resistance and impermeability to a refrigerant composed of a refrigerator oil containing PAG (polyalkylene glycol) and a flon substitute, such as HFC (hydrofluorocarbon).

A hybrid car driven by both a gasoline engine and an electric motor, and an "economical running" car having a gasoline engine adapted to stop instead of idling are being developed for practical use to avoid the global environmental problems caused by massive consumption of gasoline. In either event, the air conditioner which can be employed is of the type in which an electrically driven compressor is employed instead of an engine driven one which does not work if the engine is stopped.

An electrically driven compressor is required to have a high degree of electric insulation, since the motor is installed in a refrigerator. Accordingly, it is necessary to change the refrigerator oil containing PAG to an ester oil, e.g. POE (polyol ester), having a high degree of electric insulation. It is necessary to ensure a high degree of waterproofness against an external source in order to maintain the high electric insulation of the compressor and avoid the hydrolysis of the ester oil.

It has, however, been a drawback of the hose as shown in FIG. 1 that the IIR of the inner tube 1 is likely to swell with an ester oil easily and cannot be expected to be satisfactorily resistant or impermeable to any refrigerant for an electrically driven compressor. It has been another drawback thereof that the hose as a whole is not so designed as to be highly waterproof, but fails to resist any invasion of water through its wall from an external source satisfactorily.

Although no such problem may arise from a metal pipe used for transporting a refrigerant to an electrically driven compressor in an ordinary cabinet refrigerator, etc., it is impossible to use a metal pipe for transporting a refrigerant to a compressor in an automobile air conditioner, since a metal pipe is too rigid to withstand any vibration of the automobile, or its engine, particularly if the compressor is installed in the engine compartment.

SUMMARY OF THE INVENTION

It is, therefore, an object of this invention to provide a hose for transporting a refrigerant to an electrically driven compressor which is highly resistant and impermeable to an ester oil, and highly waterproof, unlike the known hose as described above, and is suitable for use as a hose for transporting a refrigerant to an electrically driven compressor in an automobile air conditioner.

This object is essentially attained by a hose comprising:
(1) an inner layer formed from rubber having high degrees of resistance and impermeability to an ester oil; and
(2) a laminated layer including a metallic foil, or a metallic layer formed by vapor deposition.

The above and other objects and advantages of the invention will become more apparent from the following description and the accompanying drawings.

DETAILED DESCRIPTION OF THE INVENTION

Figure 1:
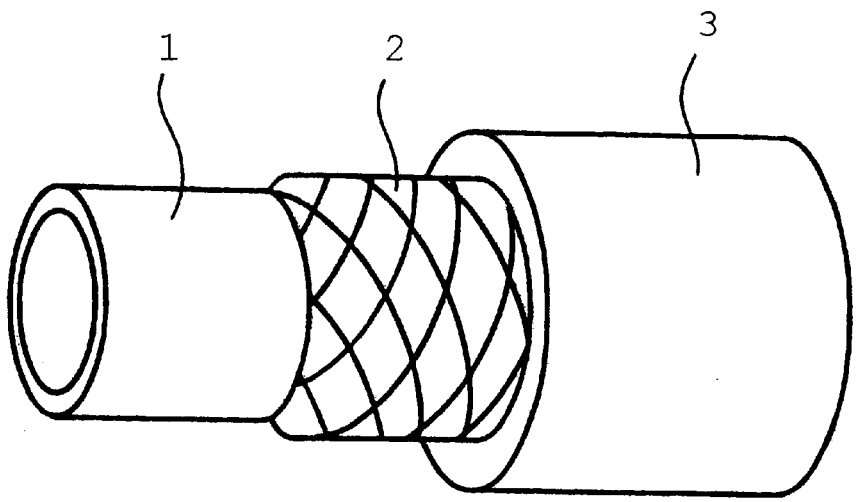
FIG. 1 is a partly cutaway perspective view of a known hose for transporting a refrigerant to an engine driven compressor.

According to a first aspect of this invention, there is provided a hose for transporting a refrigerant containing an ester oil as a refrigerator oil to an electrically driven compressor, the hose comprising:
(1) an inner layer formed from rubber having high degrees of resistance and impermeability to an ester oil; and
(2) a laminated layer including a metallic foil, or a metallic layer formed by vapor deposition.

The inner layer formed from rubber having high degrees of resistance and impermeability to an ester oil makes the hose of this invention suitable as a hose for transporting a refrigerant containing an ester oil. The laminated layer including a metallic foil, or a metallic layer formed by vapor deposition (preferably a metallic foil) makes the hose highly waterproof and prevents any invasion through its wall of water from an external source. Thus, the use of the hose according to this invention makes it possible to ensure the high electric insulation of the electrically driven compressor, and also to effectively avoid hydrolysis of the ester oil. Unlike a rigid metal pipe, the hose according to this invention is suitable for use with an electrically driven compressor in an automobile air conditioner despite the vibration of the automobile and its engine, and is useful particularly when the compressor is installed in the engine compartment of an "economical running" car.

According to a second aspect of this invention, the inner layer of the hose according to the first aspect of this invention is formed from any of nitrile rubber (NBR), hydrogenated nitrile rubber (H-NBR), chlorinated polyethylene rubber (CPE), chlorosulfonated polyethylene rubber (CSM) and acrylic rubber (ACM). All of these rubbers are very suitable as a material for the inner layer of the hose, since they are highly resistant and impermeable to an ester oil, and are not so expensive as, for example, fluororubber (FKM).

According to a third aspect of this invention, the laminated layer of the hose according to the first or second aspect of this invention comprises a helically wound, or longitudinally lapped laminated tape formed by laminating a resin film on any of the following:

(a) a metallic foil;
(b) a metallic foil and a reinforcing material; and
(c) a metallic layer formed by vapor deposition.

The resin film protects the metallic foil, etc. from being damaged or broken when the hose is bent or deformed, so that the hose may remain highly waterproof for a long time. The helically wound, or longitudinally lapped laminated tape is very easy to apply to form the laminated layer on the hose which is cylindrical in shape. If the laminated tape includes (b) a metallic foil and a reinforcing material, the stretch resistance of the reinforcing material protects the foil from being broken, even if the wall of the hose is stretched or bent by a strong force overcoming the protective action of the resin film. The metallic layer formed by vapor deposition (c) is not broken even if the wall of the hose is stretched or bent by a very strong force, so that the hose will not have a sharp reduction in waterproofness unless the laminated tape as a whole is broken.

According to a fourth aspect of this invention, the helically wound, or longitudinally lapped laminated tape in the hose according to the third aspect of this invention has overlapping portions bonded to one another. The bonded overlapping portions ensure that the laminated layer exhibit a still higher level of waterproofness.

According to a fifth aspect of this invention, the laminated layer of the hose according to any of the first to fourth aspects thereof is surrounded by a reinforcing layer formed by braiding reinforcing fibers, and an outer layer formed from an appropriate rubber. The reinforcing layer adds to the strength of the hose against a breaking or stretching force without lowering its flexibility, or vibration resistance to an undesirable extent, while giving a greater protection to the laminated layer. The outer layer also effectively protects the reinforcing and laminated layers against deterioration by environmental factors, such as weather, heat, rainwater, chemicals and oils.

According to a sixth aspect of this invention, an elastic layer is interposed between the laminated and reinforcing layers of the hose according to the fifth aspect of this invention. The elastic layer absorbs the deformation of the laminated layer and thereby effectively protects it, or its metallic foil, etc. against damage or breakage without lowering the flexibility, or vibration resistance of the hose to an undesirable extent.

Description will now be made in further detail of this invention and the first to sixth aspects thereof.

Use of the Hose:

The refrigerant hose of this invention can be used without any limitation for transporting a refrigerant containing an ester oil as a refrigerator oil (lubricant) to an electrically driven compressor. Typical examples of its use include its use with an electrically driven compressor in an automobile air conditioner, an ordinary cabinet refrigerator or a household air conditioner, but it can most advantageously be used with an electrically driven compressor in an automobile air conditioner which requires a refrigerant hose having high degrees of electric insulating property, ester oil resistance and flexibility (vibration resistance).

Overall Construction of the Hose:

The refrigerant hose of this invention consists essentially of (1) an inner layer formed from rubber having high degrees of resistance and impermeability to an ester oil, and (2) a laminated layer surrounding the inner layer and including a metallic foil, or a metallic layer formed by vapor deposition.

The hose may also include another component or layer surrounding the inner layer, or surrounded by, or surrounding the laminated layer if it does not substantially impair the functions or properties of the hose as stated above. Typical examples of such variations are the hose according to the fifth aspect of this invention which includes a reinforcing layer, or an outer layer of rubber, or both, the hose according to the sixth aspect of this invention which includes an elastic layer between the laminated layer and the reinforcing layer, and a hose which includes an intermediate layer of rubber between the inner layer of rubber and the laminated layer (or in which the inner layer of rubber is of the two-layer structure formed by an innermost layer of rubber according to the second aspect of this invention and an outer layer of an appropriate rubber).

Inner Layer:

The inner layer forms the innermost layer of the hose, and is composed of rubber having high degrees of resistance and impermeability to an ester oil. Although any rubber having such properties can be used, the use of NBR, H-NBR, CPE, CSM or ACM is, among others, preferred.

If the inner and laminated layers adjoin each other, they can be bonded to each other, and for that purpose, a thermoplastic resin film can be fused between the two layers by heating.

Laminated Layer:

The laminated layer may be of any construction if it includes a metallic foil, or a metallic layer formed by vapor deposition, but it is preferably composed of (a) a metallic foil, (b) a metallic foil and a reinforcing material, or (c) a metallic layer formed by vapor deposition, and a resin film laminated on whichever is used.

The laminated layer is preferably formed by helically winding or longitudinally lapping a laminated sheet prepared in the form of a tape by laminating a resin film on any of the materials mentioned as (a) to (c) above. A helically wound layer is formed by winding a tape helically into a completely cylindrical shape with no gaps, and a longitudinally lapped layer is formed by using a tape having a width sufficiently large to encircle the hose, placing it lengthwise parallel to the longitudinal axis thereof and lapping it therearound to form a completely cylindrical shape with no gaps.

The laminated sheet may be prepared by fusing, or adhesively bonding a resin film onto one or both sides of any of the materials (a) to (c). A laminated sheet including (c) a metallic layer formed by vapor deposition may be prepared either by forming a metallic layer on a resin film by vapor deposition, and fusing or bonding another resin film onto the metallic layer, or by forming a metallic layer on each of two resin films by vapor deposition, and fusing or bonding the metallic layers of the two films to each other.

The metallic foil and reinforcing material as mentioned at (b) above may or may not be bonded to each other, but they are preferably bonded to each other, since the reinforcing material exhibits a greater reinforcing effect when bonded to the foil. Any material (e.g. a resin layer) can be used as the reinforcing material if it exhibits a high stretch resistance, but it is preferable to use a material having a high flexibility as well as a high stretch resistance, for example, a wire mesh, or a reinforcing fabric such as canvas or nonwoven fabric.

The helically wound, or longitudinally lapped tape preferably has its edge portions overlap each other to ensure the water tightness of the laminated layer, and more preferably has its overlapping edge portions bonded to each other to ensure a still higher level of water tightness.

The resin film to be laminated on e.g. a metallic foil maybe of any resin, but is preferably of a thermoplastic resin, such as an ethylene-vinyl alcohol (EVOH), polyamide, or polyester resin, if it is to be fused to the foil.

Other Components of the Hose:

The refrigerant hose of this invention, which comprises the inner and laminated layers as stated above, may include an additional component layer or layers. A few examples of additional layers will now be described.

A reinforcing layer may be formed over the laminated layer. The reinforcing layer is not specifically limited in construction, but may, for example, comprise a braided wire layer, a braided layer of reinforcing fibers, two spiral layers of reinforcing fibers wound spirally in opposite directions, respectively, or two such spiral layers between which an intermediate layer of rubber is disposed. A braided layer of reinforcing fibers, such as aramid or polyester fibers, is preferred to ensure the flexibility and electric insulation of the hose.

An elastic layer may be provided between the laminated layer and the reinforcing layer for protecting the laminated layer by e.g. absorbing its deformation. The elastic layer may be of any appropriate material, but is preferably of a solid or spongy soft rubber. The elastic layer may be bonded to the laminated layer, and for that purpose, a thermoplastic resin film may be fused therebetween by heating.

An outer layer of rubber may be provided as the outermost layer of the hose. It may be of any rubber, but is preferably of e.g. chloroprene rubber (CR), IIR, CSM or EPDM to form a layer of high weatherability.

Figure 7:
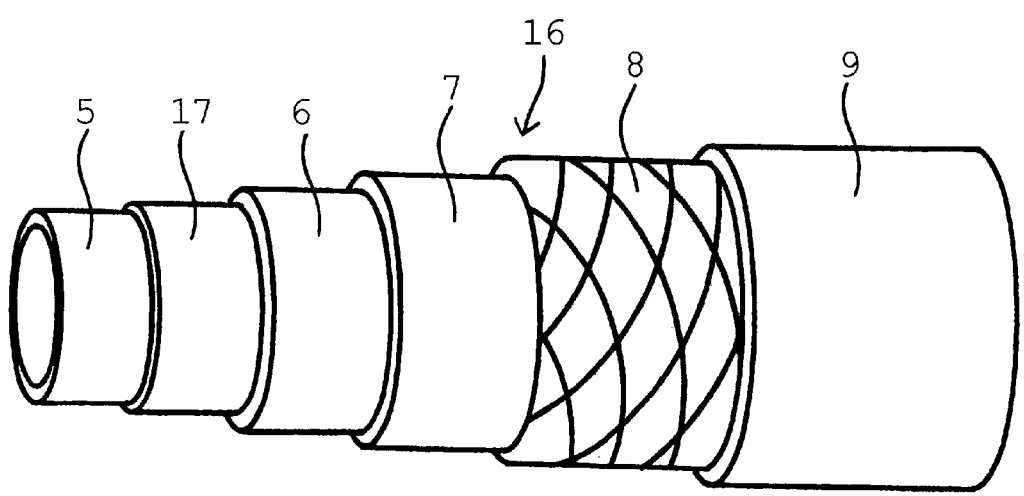
FIG. 7 is a partially cutaway perspective view of a hose according to another preferred embodiment of his invention.

An intermediate layer 17 of rubber may be provided between the inner layer of rubber and the laminated layer. It may be of any rubber, and may be bonded to the inner or laminated layer, or both. It may, for example, be of the same material as the elastic layer, and may be bonded to the laminated layer for protecting it by e.g. absorbing its deformation. It may alternatively be joined to the inner layer by vulcanization bonding to form the outer layer of a two-layered inner rubber tube portion. FIG. 7 shows a refrigerant hose 16, including an intermediate layer 17 and a laminated layer. Numerals 5 to 9 in FIG. 7 are similar to those of FIG. 2.

DESCRIPTION OF THE PREFERRED EMBODIMENTS

The invention will now be described more specifically by a few preferred forms of its embodiment as shown in the drawings.

Embodiment 1

Figure 2:
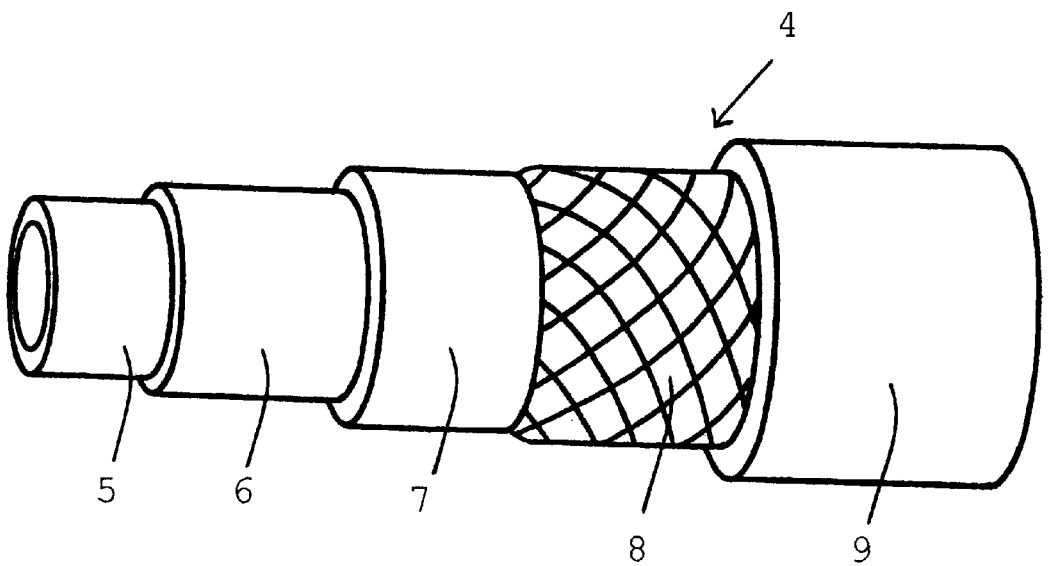
FIG. 2 is a partly cutaway perspective view of a hose according to a first preferred embodiment of this invention for transporting a refrigerant to an electrically driven compressor.
Figure 3A:
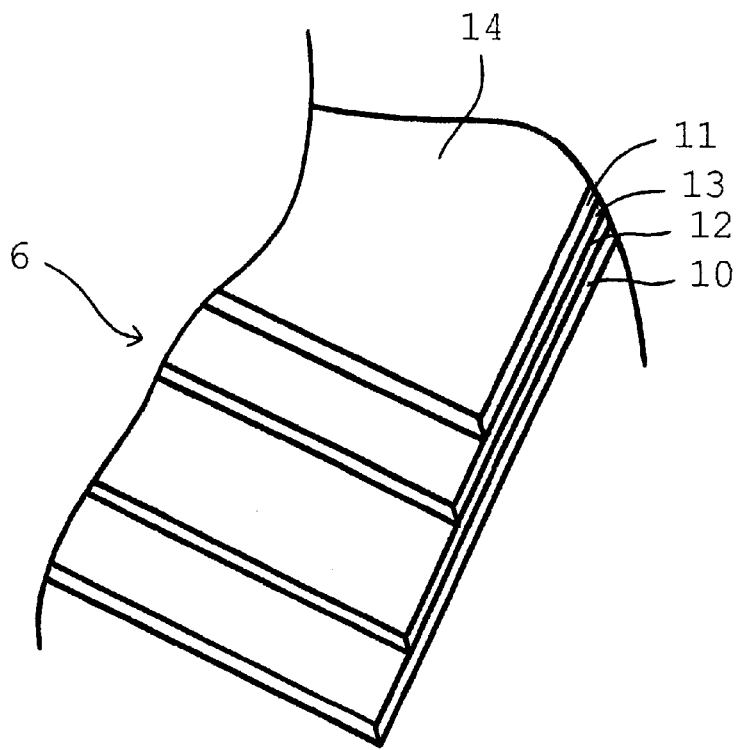
FIG. 3A is a partly cutaway perspective view of the laminated layer of the hose shown in FIG. 2.
Figure 3B:
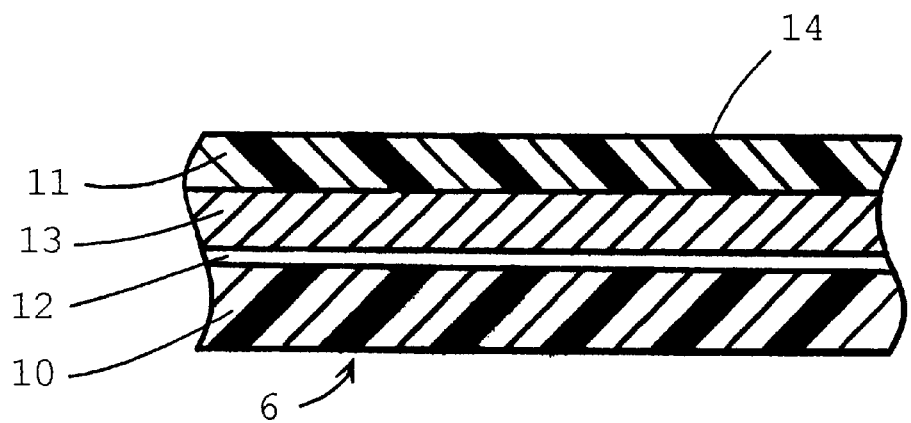
FIG. 3B is a cross sectional view of the same laminated layer.

FIG. 2 shows a refrigerant hose 4 which comprises an inner layer 5 of H-NBR, a laminated layer 6 shown in detail in FIGS. 3A and 3B, an elastic layer 7 of EPDM, a reinforcing layer 8 formed by braiding an appropriate kind of reinforcing fibers and an outer layer 9 of CR, as mentioned in the order of layers from its radially innermost to outermost layer.

The laminated layer 6 is formed from a laminated sheet 14 prepared by interposing a metallic foil 12 and a reinforcing material of canvas 13 between an inner fused resin layer 10 and an outer fused resin layer 11 each consisting of a thin film of a polyester resin, as shown in FIGS. 3A and 3B. The foil 12 is integrally bonded to the reinforcing material 13 by an adhesive not shown, and is so held thereby that no tension acting upon the laminated layer 6 may affect the foil 12.

Although FIGS. 3A and 3B show the foil 12 positioned radially inwardly of the reinforcing material 13, their positions can be reversed.

The inner resin layer 10 and the foil 12 are joined to each other by the thermal fusion of the resin layer 10 when the hose is manufactured, and the outer resin layer 11 and the reinforcing material 13 by the fusion of the resin layer 11. Although the resin layers 10 and 11 are normally joined to the foil 12 and the reinforcing material 13, respectively, they may slide thereon if they are stretched by a tensile force.

Figure 4:
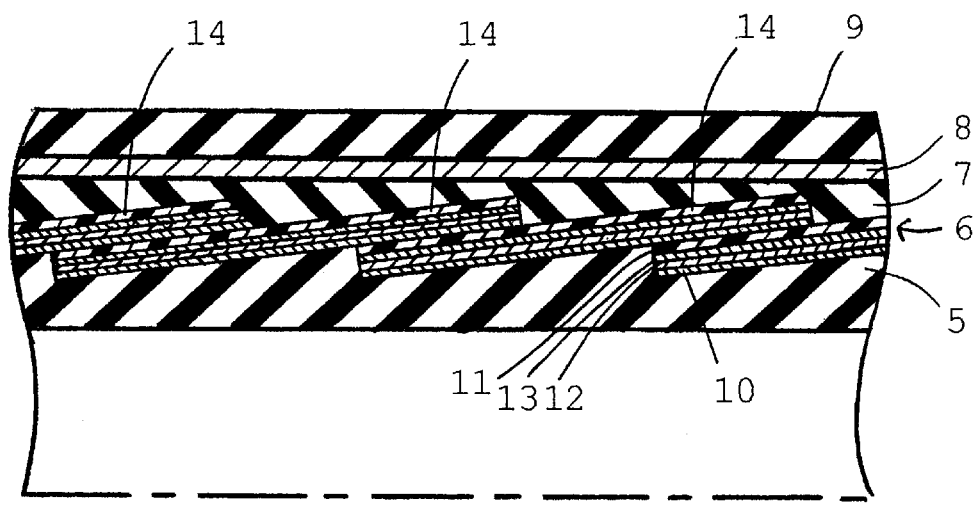
FIG. 4 is a fragmentary longitudinal sectional view of the hose shown in FIG. 2.

The laminated layer 6 is formed by the laminated sheet 14 in the form of a tape wound helically about the inner layer 5, as shown in FIG. 4. The laminated sheet 14 has its edge portions overlap each other, and its overlapping portions are joined to each other by the thermal fusion of the resin layers 10 and 11 to ensure that no water from any external source pass into the hose through its wall.

Figure 5:
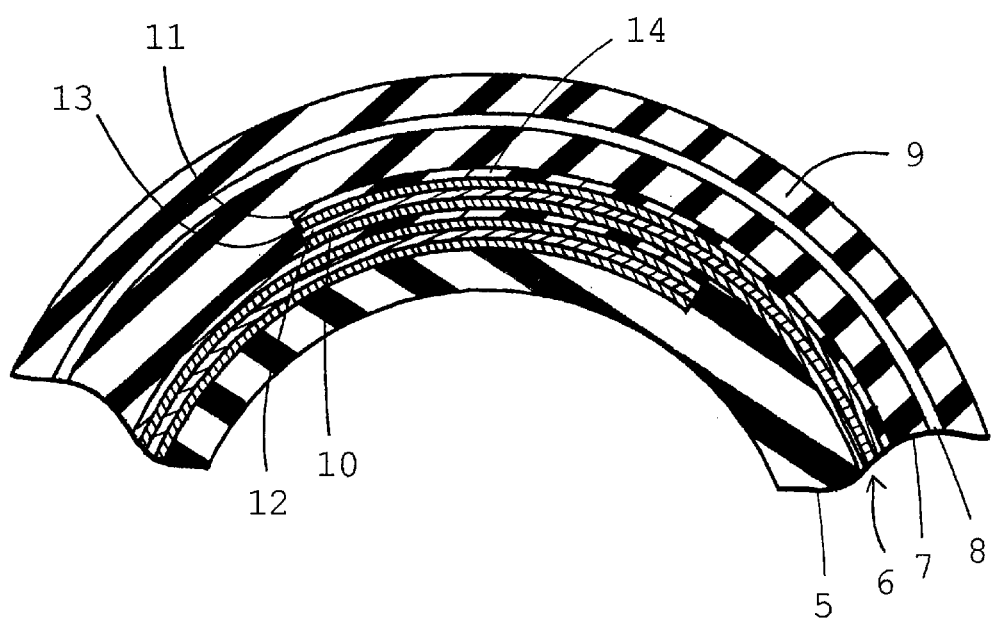
FIG. 5 is a fragmentary transverse sectional view of the hose shown in FIG. 2.

A modified form of laminated layer 6 can be formed by applying a tape 14 longitudinally of the inner layer 5 and lapping it thereabout, as shown in FIG. 5. The tape 14 again has its edge portions overlap each other, and its overlapping portions are preferably joined to each other by the thermal fusion of the resin layers 10 and 11.

Embodiment 2

Figure 6:
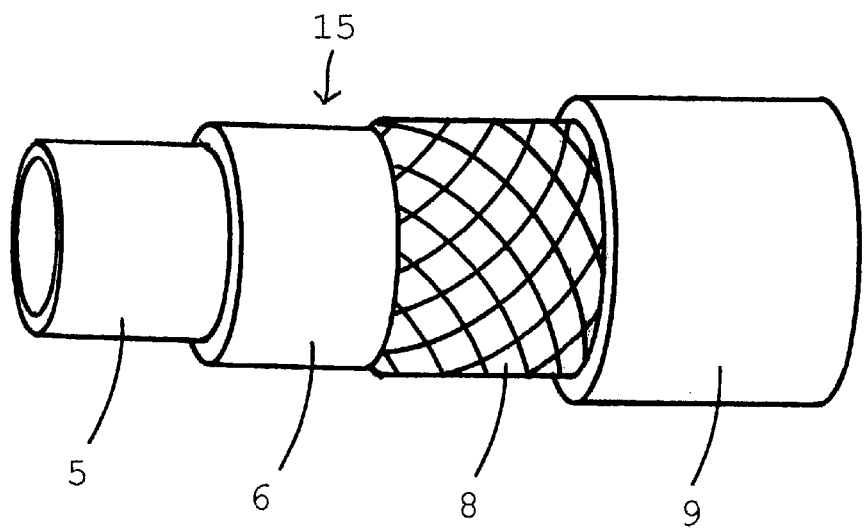
FIG. 6 is a partly cutaway perspective view of a hose according to a second preferred embodiment of this invention.

FIG. 6 shows a refrigerant hose 15 which comprises an inner layer 5 of rubber, a laminated layer 6, a reinforcing layer 8 and an outer layer 9 of rubber, in order of layers from its radially innermost to outermost layer. It is of the same construction as the hose shown in FIG. 2, but excluding the elastic layer 7.

Modified Embodiments

The reinforcing layer 8 can be removed from the hose 4 according to Embodiment 1 of this invention as shown in FIG. 2, or from the hose 15 according to Embodiment 2 as shown in FIG. 6.

While the invention has been described by way of the preferred embodiments thereof, variations thereto will occur to those skilled in the art within the scope of the present inventive concepts which are delineated by the following claims.

What is claimed is:

1. A hose for transporting a refrigerant containing an ester oil as a refrigerator oil to an electrically driven compressor, comprising:

(1) an inner layer formed from rubber having high degrees of resistance and impermeability to an ester oil; and (2) a laminated layer including a metallic foil, or a metallic layer formed by vapor deposition.

2. A hose as set forth in claim 1, wherein said compressor is of an automobile air conditioner.

3. A hose as set forth in claim 1, wherein said rubber is selected from among nitrile rubber (NBR), hydrogenated nitrile rubber (H-NBR), chlorinated polyethylene rubber (CPE), chlorosulfonated polyethylene rubber (CSM) and acrylic rubber (ACM).

4. A hose as set forth in claim 1, wherein said inner and laminated layers are bonded to each other.

5. A hose as set forth in claim 1, wherein said laminated layer comprises a laminated sheet in the form of a tape formed by laminating a resin film on any of the following:

(a) a metallic foil;

(b) a metallic foil and a reinforcing material; and (c) a metallic layer formed by vapor deposition.

6. A hose as set forth in claim 5, wherein said laminated layer comprises said tape wound helically or lapped longitudinally on said inner layer.

7. A hose as set forth in claim 5, wherein said foil and said reinforcing material are bonded to each other.

8. A hose as set forth in claim 5, wherein said reinforcing material is selected from among a wire mesh, a canvas and a nonwoven fabric.

9. A hose as set forth in claim 6, wherein said tape has its edge portions overlapping each other and bonded to each other.

10. A hose as set forth in claim 5, wherein said laminated sheet has said resin film fused, or adhesively bonded to at least one side of any of said (a) to (c).

11. A hose as set forth in claim 5, wherein said resin film is of a resin selected from among ethylene-vinyl alcohol, and polyamide and polyester resins.

12. A hose as set forth in claim 1, further comprising a reinforcing layer formed around said laminated layer by a braided layer of wire or reinforcing fiber.

13. A hose as set forth in claim 12, further comprising an elastic layer formed between said laminated and reinforcing layers.

14. A hose as set forth in claim 1, further comprising an intermediate layer of rubber formed between said inner and laminated layers.

15. A hose as set forth in claim 1, further comprising an outer layer of rubber as its outermost layer.

16. A hose as set forth in claim 15, wherein said outer layer is of any rubber selected from among chloroprene rubber, isobutylene-isoprene rubber, chlorosulfonated polyethylene rubber and ethylene-propylene-diene rubber.

17. A hose as set forth in claim 5, wherein said laminated layer comprises said laminated sheet formed by laminating a resin film on a metallic foil, or on a metallic foil and a reinforcing material.

\* \* \* \* \*